United States Patent [19]

Lin

[11] Patent Number: 4,946,574

[45] Date of Patent: Aug. 7, 1990

[54] APPARATUS FOR THE PRODUCTION OF STERILIZED CALCIUM-ION WATER

[76] Inventor: Chun-Ew Lin, No. 205, Ming-Cherng Rd., San-Ming Dist., Kaohsiung City, Taiwan

[21] Appl. No.: 405,203

[22] Filed: Sep. 11, 1989

[51] Int. Cl.$^5$ .................... C25B 15/08; C25B 9/00; B01D 13/02

[52] U.S. Cl. .................... 204/229; 204/230; 204/240; 204/269; 204/306

[58] Field of Search ............ 204/149, 152, 228, 229, 204/230, 240, 269, 231, 306

[56] References Cited

U.S. PATENT DOCUMENTS

| | | | |
|---|---|---|---|
| 3,095,365 | 6/1963 | Green | 204/229 |
| 4,009,104 | 2/1977 | Behrendt et al. | 204/149 X |
| 4,104,159 | 8/1978 | Kanai | 204/149 X |
| 4,572,775 | 2/1986 | Paniagua | 204/229 |
| 4,800,005 | 1/1989 | Rosenfield et al. | 204/269 X |

*Primary Examiner*—Donald R. Valentine

*Attorney, Agent, or Firm*—Nixon & Vanderhye

[57] ABSTRACT

An apparatus for the production of sterilized and calcium-ion water includes: a housing structure; an electrolytic cell with electrical terminals and electrodes installed in the housing structure; a plurality of electromagnetic valves separately provided at a water-intake pipe and a water-drain pipe in communication with the electrolytic cell; a setting switch disposed in the housing structure and electrically coupled with the electrolytic cell for adjusting the current intensity of electrolysis therewith; a hydraulic-pressure switch provided at a water pressure pipe for the control of the water-level in the electrolytic cell; an ultraviolet sterilizing tank connected to the electrolytic cell for sterilizing the electrolyzed water; and a control circuit respectively coupled with the electrolytic cell, the electromagnetic valves and the setting and hydraulic switches; whereby, calcium-ion water can be effectively produced for drinking purposes.

4 Claims, 4 Drawing Sheets

APPARATUS FOR THE PRODUCTION OF STERILIZED CALCIUM-ION WATER

BACKGROUND OF THE INVENTION

This invention relates to an apparatus for the production of sterilized calcium-ion water, and particularly to a kind of apparatus by which a weak alkaline calcium-ion water can be produced via the interrelated action of a positively charged electrode and negatively charged electrodes of an electrolytic cell, and sterilized through an ultraviolet tank associated with said electrolytic cell so as to produce healthy drinking water therewith.

A calcium deficiency in the human body can lead to such serious health problems as rickets or osteoporosis. To make up for this deficiency, calcium supplements are usually administered. However, it has been found that an accumulation of negatively charged high-level acidic toxins in the human body can greatly reduce the transmission of positively charged calcium ions hindering the reduction of a calcium deficiency. In light of this, a healthy alkaline medium is needed to provide a calcium-ion supplement to the human body.

SUMMARY OF THE INVENTION

It is accordingly a primary object of the present invention to help prevent health problems associated with a calcium deficiency by providing an apparatus which produces sterilized alkaline drinking water supplemented with calcium-ions.

This and other objects of the present invention are achieved by the provision of an apparatus for the production of a sterilized calcium-ion water, which apparatus comprises: a housing structure; an electrolytic cell having a plurality of terminals and electrode plates disposed therein installed in said housing structure for performing electrolysis therewith; a plurality of electromagnetic valves respectively provided at a water-intake pipe and a water-drain pipe in said housing structure and communicatively connected to said electrolytic cell for being actuated to control the intake and drain of water therefrom; a setting switch electrically installed therein in conjunction with said electrolytic cell for adjusting the current intensity of the electrolysis thereof; a hydraulic pressure switch disposed therein in communication with said electrolytic cell for controlling the water level thereof; an ultraviolet sterilizing means communicatively connected to said electrolytic cell for sterilizing the calcium-ion water produced therefrom; and a control circuit means electrically coupled with said electrolytic cell, said electromagnetic valves, said setting switch, and said hydraulic pressure switch for effecting electrical control operations therewith; whereby, calcium-ion water can be effectively produced and sterilized for drinking purposes.

Other advantages and characteristics of the present invention will become clear from the following detailed description of a preferred embodiment when read in conjunction with the accompanying drawings.

DETAILED DESCRIPTION OF THE PREFERRED EMBODIMENT

Figure 1:
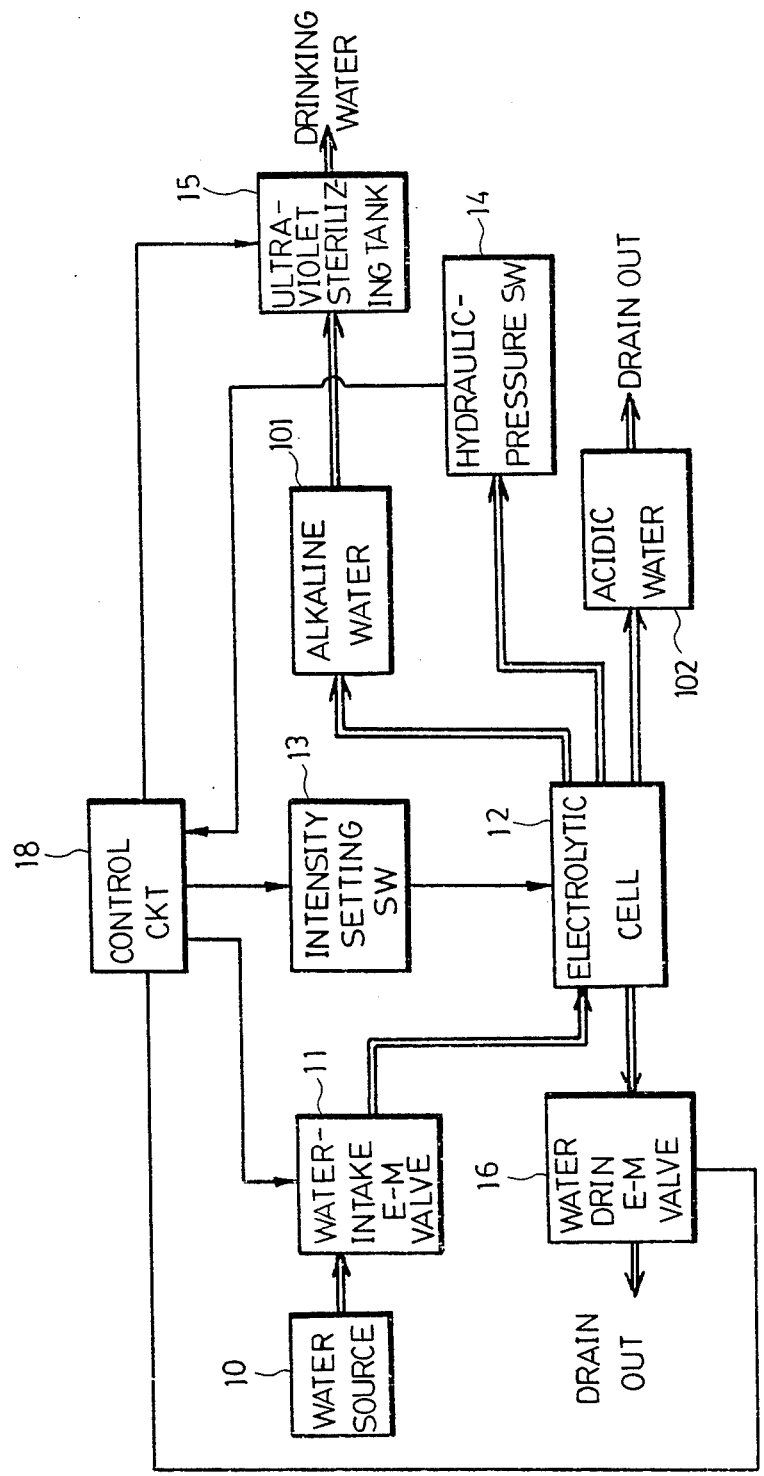
FIG. 1 is a block diagram indicating a production process of the preferred embodiment of an apparatus for the production of sterilized calcium-ion water according to the present invention.

Referring to FIG. 1, the production process of the preferred embodiment of an apparatus for the production of sterilized calcium-ion water according to the present invention is as follows:

Water from a water-source 10 is supplied to an electrolytic cell 12 under the control of an activated electromagnetic water-intake valve 11 for performing electrolysis operations; an electrolyte-intensity setting switch 13, which is electrically coupled with said electrolytic cell 12, is adjusted to set the current intensity of electrolysis thereof. After the electrolysis is completed, the electrolyzed water from said electrolytic cell 12 is divided into alkaline water 101 and acidic water 102 wherein said acidic water 102 is directly drained out, since it cannot be used for drinking, while said alkaline water flows into an ultraviolet sterilizing tank 15 to be sterilized therein before flowing out therefrom to be used for drinking purposes. In addition, the water level in said electrolytic cell 12 is under the control of a hydraulic pressure switch 14. When the water level in said electrolytic cell 12 has reached a given level, a signal from said hydraulic pressure switch 14 will be transmitted to a control circuit device 18 which in turn is energized to shut off said electromagnetic water-intake valve 11 so that the water from said water source 10 no longer flows into said electrolytic cell 13. On the other hand, if the preferred embodiment of the calcium-ion water production apparatus is not going to be used for a certain length of time, the water in said electrolytic cell 12 can be drained out by opening an electromagnetic water-drain valve 16.

Figure 2:
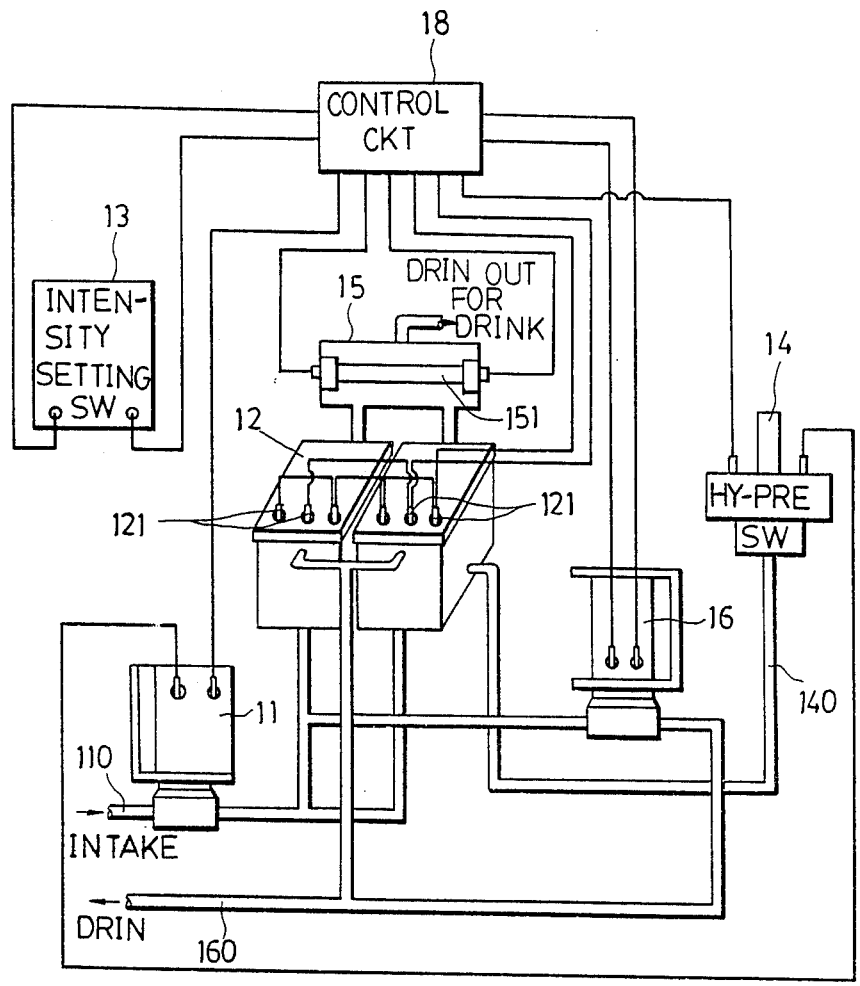
FIG. 2 is a schematic illustrative view of the preferred embodiment of the apparatus for the production of sterilized calcium-ion water of the present invention.
Figure 3:
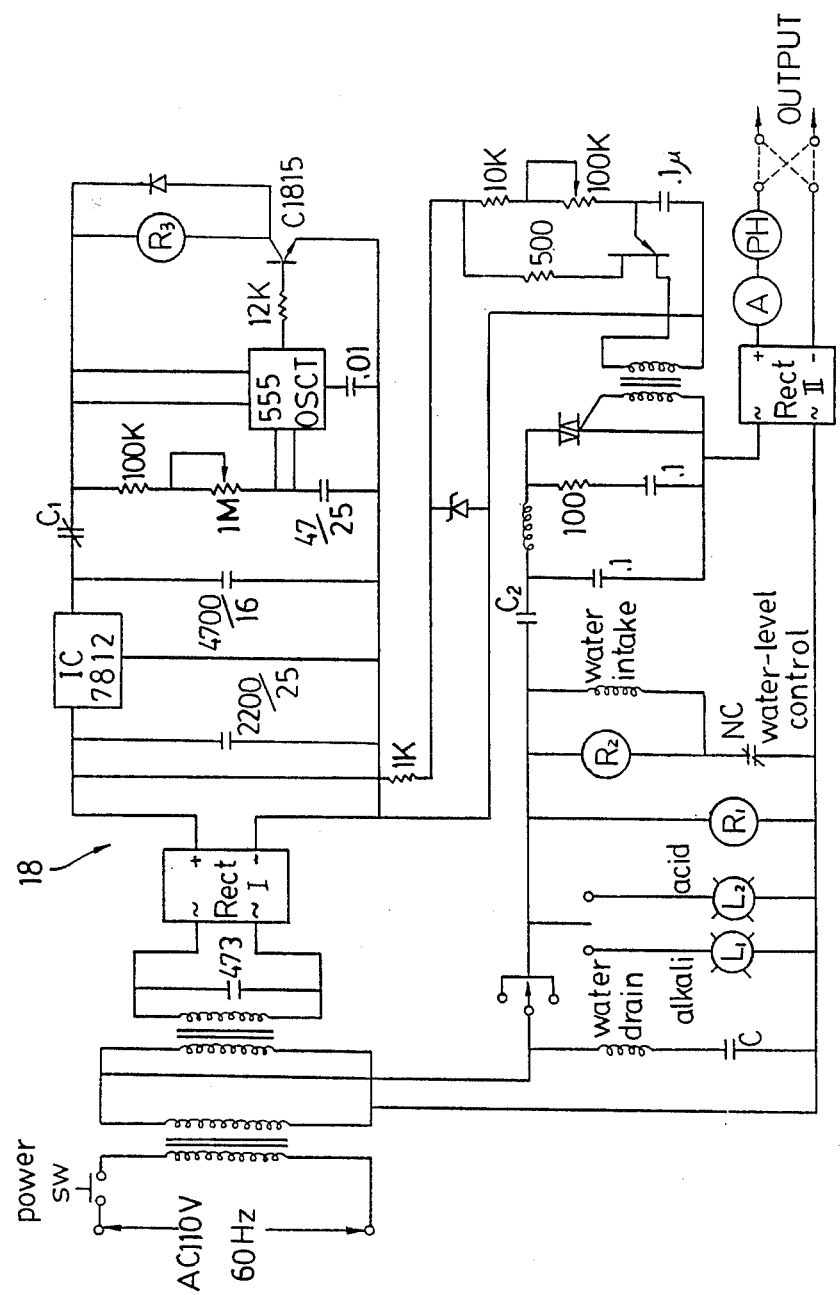
FIG. 3 is a circuit diagram of a control circuit means adapted in the preferred embodiment of FIG. 2.
Figure 4:
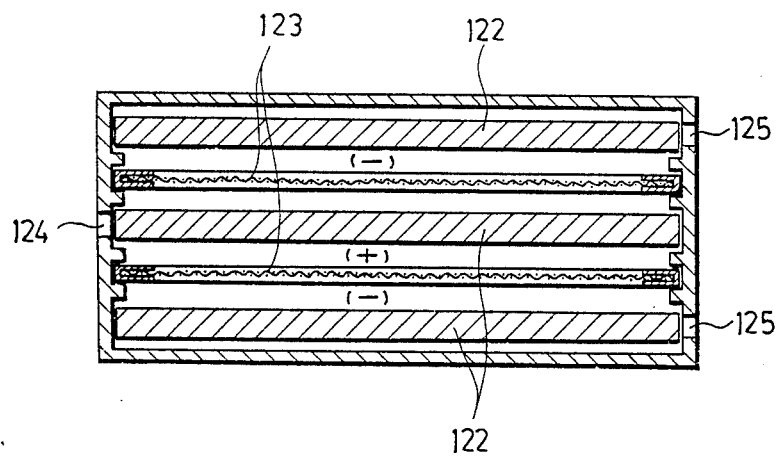
FIG. 4 is a sectional view of an electrolytic cell adapted in the preferred embodiment of FIG. 2.

Referring to FIGS. 2, 3 and 4, the embodiment of the apparatus for the production of calcium-ion water according to the present invention comprises: a housing structure (not shown); an electrolytic cell 12 with a plurality of terminals 121 and a plurality of electrode plates 122 which are respectively disposed in said electrolytic cell 12 and electrically coupled with said terminals, (as shown in FIG. 4), installed in said housing structure (not shown) for performing electrolysis operations; an electromagnetic water-intake valve 11 installed at a water intake pipe 110 and an electromagnetic water-drain valve 16 installed at a water drain pipe 160 separately provided in said housing structure (not shown) and communicatively connected to said electrolytic cell 12 for separately effecting water intake and drain operations therewith; an electrolyte-intensity setting switch 13 provided on said housing structure and electrically coupled with said electrolytic cell 12 for adjusting the current intensity of the electrolysis thereof; a hydraulic pressure switch 14 disposed at a water pressure pipe 140 in said housing structure and communicatively connected to said electrolytic cell 12 for controlling the water level therein; an ultraviolet tank 15 having an ultraviolet sterilizing lamp 151 installed at an outlet pipe in said housing structure and communicatively connected to said electrolytic cell 12 for sterilizing the electrolyzed water thereof and draining the sterilized water therefrom for drinking purposes; and a control circuit device 18 having a plurality of electrical elements disposed therein electrically coupled with the terminals 121 of said electrolytic cell 12, said electromagnetic water-intake and water-drain valves 11, 16, said setting switch 13, said hydraulic pressure switch 14 and the ultraviolet sterilizing lamp 151 of said ultraviolet sterilizing tank 15 for controlling and effecting calcium-ion water production operations.

As shown in FIGS. 2 and 3, when the water in said electrolytic cell 12 lowers to a certain level which is detected by said hydraulic-pressure switch 14, said control circuit device 18 will energize said electromagnetic water-intake valve 11 to open said water intake pipe 110 and allow water to flow therefrom into said electrolytic cell 12, and, in the meantime, said setting switch 13 is adjusted to set the electrolysis intensity of said electrolytic cell 12. After the water level in said electrolytic cell 12 has reached a given level, said hydraulic-pressure switch 14 will open and said control circuit device 18 will be again actuated to de-energize said electromagnetic water-intake valve 11 so as to shut off the water-intake pipe 110 thereat. After electrolysis, the electrolyzed water in said electrolytic cell 12 is divided into alkaline water 101 and acidic water 102. Since said acidic water 102 cannot be used for drinking, it is directly drained from said electrolytic cell 12 through said water-drain pipe 160. However, said alkaline water 101 will flow into said ultraviolet sterilizing tank 15 and be sterilized therein before being drained therefrom for drinking purposes.

As shown in FIG. 4, said electrolytic cell 12 includes three electrode plates 122 separately disposed therein and a plurality of net-type filtering troughs 123 parallel positioned between said electrode plates 122 for filtering purposes. Of the three electrode plates 122, the middle plate is connected to the positive terminals of the electrolytic cell 12 while the other two at both sides thereof are connected to the negative terminals of the electrolytic cell 12. During electrolysis, the water which is electrolyzed through said positive electrode plate 122 will become alkaline water 101 while the water which is electrolyzed through said negative electrode plates 122 will become acidic water 102 in said electrolytic cell 12. In order to drain said alkaline water and said acidic water from said electrolytic cell 12, an alkaline-water outlet 124 is provided thereat in line with said positive electrode plate 122, leading into said ultraviolet sterilizing tank 15, and two acidic-water outlets 125 are separately provided thereat in line with said two negative electrode plates 122, leading out of said housing structure through said water-drain pipe 160. In this way, the alkaline water 101 and the acidic water 102, produced in said electrolytic cell 12 after electrolysis, will flow out of respective outlets 124, 125. Furthermore, when said control circuit device 18 is actuated to energize said electromagnetic water-intake valve 16, the positive and negative polarities of the terminals 121 on said electrolytic cell 12 will be simultaneously changed. Following this polarity-change method and the instantaneous change of positive and negative polarities of said electrode plates 122, the soiled matter originally accumulated on said electrode plates 122 will be cleared from said electrode plates 122 so as to prevent the same from being etched, thereby maintaining a prolonged electrolytic life expectancy.

Another salient feature of the present invention is the provision of said ultraviolet sterilizing tank 15 installed at the outlet of said alkaline water 101. With the ultraviolet lamp 151 being disposed in said ultraviolet tank 15 and operated by said control circuit device 18, said alkaline water 101 can be sterilized before being drained from said ultraviolet tank 15 for drinking purposes so as to ensure the quality thereof.

The foregoing is considered as illustrative only of the principle of the present invention. Further, since numerous modifications and changes will readily occur to those skilled in the art, it is not desired to limit the present invention to the exact construction and operation shown and described, and accordingly all suitable modifications and equivalents which may be resorted to, fall within the scope of the present invention as defined in the appended claims.

What is claimed is:

1. An apparatus for the production of sterilized calcium-ion water comprising:
   a housing structure;
   an electrolytic cell having a plurality of positive and negative terminals and electrode means respectively disposed therein installed in said housing structure for performing electrolysis operations and producing the desired calcium-ion water through said electrode means;
   an electromagnetic water-intake valve installed at a water-intake pipe in said housing structure and communicatively connected to said electrolytic cell for being activated to supply water thereto;
   an electromagnetic water-drain valve provided at a water-drain pipe in said housing structure and communicatively connected to said electrolytic cell for being activated to drain water from said electrolytic cell;
   a setting switch provided at said housing structure and electrically coupled with said electrolytic cell for being operated to adjust the current intensity of the electrolysis thereof;
   a hydraulic-pressure switch provided at a water-pressure pipe in said housing structure and communicatively connected to said electrolytic cell for being actuated to detect the water level therein and control water intake through said electromagnetic water-intake valve;
   an ultraviolet sterilizing tank having an ultraviolet lamp electrically disposed therein installed at an outlet pipe communicatively connected to said electrolytic cell for sterilizing desired water produced therefrom before draining out for drinking purpose; and
   a control circuit electrically coupled with said electrolytic cell, said electromagnetic water-intake and water-drain valves, said setting switch, said hydraulic-pressure switch and said ultraviolet sterilizing tank for effecting control operations therewith; whereby, calcium-ion water can be effectively produced and sterilized for drinking purposes.

2. An apparatus according to claim 1 wherein said electrode means comprises three electrode plates parallel installed in said electrolytic cell wherein one intermediate electrode plate is connected to the positive terminals of said electrolytic cell while other two electrode plates are connected to the negative terminals of said electrolytic cell so that, by an interrelated action of one positive polarity and two negative polarities of said electrode plates, weak-alkaline calcium-ion water can be produced therefrom.

3. An apparatus according to claim 2 wherein said electrolytic cell further comprises a plurality of net-type filtering troughs parallel positioned between said electrode plates for filtering purposes.

4. An apparatus according to claim 2 wherein said electrolytic cell further comprises an alkaline-water outlet provided therein in line with said positively terminated intermediate electrode plate, leading to said ultraviolet sterilizing tank, and a pair of acidic-water outlets located therein respectively in line with said negatively terminated electrode plates, leading into said water-drain pipe; whereby, alkaline water and acidic water, produced in said electrolytic cell after electrolysis, can flow respectively out of said alkaline-water outlet and said acidic-water outlets.

* * * * *